United States Patent [19]
Humphrey

[11] 3,964,818
[45] June 22, 1976

[54] REMOTE STEREO MICROSCOPE WITH FIELD MIRROR REFLECTED OCULAR PATHS

[75] Inventor: William E. Humphrey, Oakland, Calif.

[73] Assignee: Humphrey Instruments, Inc., Berkeley, Calif.

[22] Filed: Mar. 28, 1975

[21] Appl. No.: 563,281

[52] U.S. Cl. ................................. 350/36; 350/55; 350/137; 353/7
[51] Int. Cl.² ................. G02B 21/20; G02B 17/00; G02B 27/24; G03B 21/00
[58] Field of Search ................. 350/55, 49, 33, 35, 350/36, 199, 296, 27, 9, 130, 131, 137, 138, 286, 145; 353/98, 99, 7

[56] References Cited
UNITED STATES PATENTS

| | | | |
|---|---|---|---|
| 3,196,742 | 7/1965 | Sparling | 350/49 |
| 3,225,647 | 12/1965 | Robinson et al. | 350/55 |
| 3,418,033 | 12/1968 | Hope | 350/27 |
| 3,447,854 | 6/1969 | Minter | 350/27 |
| 3,572,893 | 3/1971 | Bennett et al. | 350/55 |
| 3,704,932 | 12/1972 | Schick | 350/137 |

FOREIGN PATENTS OR APPLICATIONS

| | | | |
|---|---|---|---|
| 983,313 | 2/1965 | United Kingdom | 350/35 |
| 908,319 | 10/1962 | United Kingdom | 350/145 |

*Primary Examiner*—John K. Corbin
*Assistant Examiner*—Jon W. Henry
*Attorney, Agent, or Firm*—Townsend and Townsend

[57] ABSTRACT

A single field mirror serves as a relay for paired images being magnified by a stereo magnifier from an object to a spatial location removed from the field mirror for remote stereo viewing. A simple or compound stereo magnifier or microscope having paired optical paths receives the image of the object for each ocular path and projects each image to the plane of the single field mirror. The ocular path for each eye between the object and paired eyes of the viewer is routed off axis from the mirror in two aspects, typically by a periscoping system. The left eye path approaches the field mirror typically below and from the right of the field mirror axis; the right eye path approaches the field mirror typically below and from the left of the field mirror axis. Upon impingement and reflection of the routed eye paths at the field mirror, reversal of the routed eye paths occurs to remotely reflect a stereo magnified image with binocular image parity for remote view. The left eye path leaves the field mirror above and to the left of the field mirror axis; the right eye path leaves the field mirror above and to the right of the field mirror axis. The periscoping system is typically placed immediate to or in the magnifier optics in a prism array (which preferably includes a prism). Light for one eye path is totally reflected at a first prism wall to cross under the mirror axis and pass normally to and out of the prism at a second wall. A plane mirror or combination of mirrors relays the object image for one ocular to the plane of the field mirror. Likewise, light for the other eye path is totally reflected at the second prism wall to cross under the mirror axis and pass normally to and out of the prism at the first wall. Another plane mirror or combination of mirrors relays the object image for the other ocular to the plane of the field mirror. The stereo images thus cross each other in space interior of the prism. The images are then relayed to the plane of the field mirror. However, the magnifier exit pupil for each ocular is relayed in space a distance from the field mirror. Each eye of the viewer when positioned at each relayed pupil only views that part of the stereo view intended for that particular eye. This stereo viewing does not generate appreciable coma, astigmatism, spherical aberration and distortion associated with the off-axis use of a conventional spherical field mirror.

15 Claims, 8 Drawing Figures

FIG_3A

FIG_3B

FIG_4

FIG_5

REMOTE STEREO MICROSCOPE WITH FIELD MIRROR REFLECTED OCULAR PATHS

This invention relates to microscopes and, in particular, to stereo microscopes. Specifically, a remote view stereo microscope is disclosed having images for each ocular projected to the plane of a field mirror with the exit pupils of a stereo magnifier of microscope relayed to remote and separate locations from the field mirror for remote stereo view.

SUMMARY OF THE PRIOR ART

The projection of magnified stereo images is known but is not commonly associated with microscopes. Typically, stereo projection has been confined to eye pieces. Such eye pieces provide no alternative real world view of an object in stereo unless the eyes of the viewer are removed from the vicinity of the eye piece, generating substantial head motion. Thus, a worker has to choose between a position wherein his head is addressed to the stereo eye pieces and a position wherein his head is away from the eye pieces where he is afforded a direct stereo view of an object.

Eye pieces also have stops or exit pupils associated with them which require the eye of a viewer to be immediately adjacent the eye piece. Where the viewer has an appreciable optical prescription — especially one including cylinder — eye piece instruments cannot be conveniently used without individual changes peculiar to the operator's optical prescription unless specially designed eye pieces are used to provide clearance for spectacles.

SUMMARY OF THE INVENTION

A single field mirror serves as a relay for paired images being magnified by a stereo magnifier from an object to a spatial location removed from the field mirror for remote stereo viewing. A simple or compound stereo magnifier or microscope having paired optical paths receives the image of the object for each ocular path and projects each image to the plane of the single field mirror. The ocular path for each eye between the object and paired eyes of the viewer is routed off axis from the mirror in two aspects, typically by a periscoping system. The left eye path approaches the field mirror typically below and from the right of the field mirror axis; the right eye path approaches the field mirror typically below and from the left of the field mirror axis. Upon impingement and reflection of the routed eye paths at the field mirror, reversal of the routed eye paths occurs to remotely reflect a stereo magnified image with binocular image parity for remote view. The left eye path leaves the field mirror above and to the left of the field mirror axis; the right eye path leaves the field mirror above and to the right of the field mirror axis. The periscoping system is typically placed immediate to or in the magnifier optics in a prism array (which preferably includes a prism). Light for one eye path is totally reflected at a first prism wall to cross under the mirror axis and pass normally to and out of the prism at a second wall. A plane mirror or combination of mirrors relays the object image for one ocular to the plane of the field mirror. Likewise, light for the other eye path is totally reflected at the second prism wall to cross under the mirror axis and pass normally to and out of the prism at the first wall. Another plane mirror or combination of mirrors relays the object image for the other ocular to the plane of the field mirror. The stereo images thus cross each other in space interior of the prism. The images are then relayed to the plane of the field mirror. However, the magnifier exit pupil for each ocular is relayed in space a distance from the field mirror. Each eye of the viewer when positioned at each relayed pupil only views that part of the stereo view intended for that particular eye. This stereo viewing does not generate appreciable coma, astigmatism, spherical aberration and distortion associated with the off-axis use of a conventional spherical field mirror.

OBJECTS AND ADVANTAGES OF THE INVENTION

An object of this invention is to disclose an optical path for relaying images produced by a stereo magnifier or microscope to a remote location in space. Typically, the ocular path for each eye between the object and the paired eyes of the viewer is routed off-axis from the mirror in two aspects, typically by a periscoping system. The left eye path approaches the field mirror typically below and from the right of the field mirror axis; the right eye path approaches the field mirror typically below and from the left of the field mirror axis. Upon impingement and reflection of the routed eye paths to the field mirror, reversal of the routed eye path occurs. The left eye path leaves the field mirror above and to the left of the field mirror axis; the right eye path leaves the field mirror above and to the right of the field mirror axis. By utilizing the field mirror for each ocular path to relay the stop of the magnifier for each eye to discrete, spaced apart locations in space, a stereo view can result to a viewer remote from the mirror.

An advantage of this invention is that a stereo view can be obtained either direct to the object, or alternately direct into the field mirror in a magnified image mode. When view to the field mirror occurs, the relayed stop for each ocular preserves the stereo view for each eye. Thus, either a direct view of the object or a magnified view of the object, both with correct stereoscopic perception, results.

A further object of this invention is to broadcast both images for both eyes into substantially the plane of the field mirror.

An advantage of this aspect of the invention is that the field mirror can project to each eye an ocular view so that the combined images form a stereo view. The ocular view for one eye is isolated from the ocular view of the other eye when both eyes are located at or near relayed stops of the stereo magnifier or microscope.

A further advantage of this invention is that by providing slightly diverging paths from the mirror, variable ocular spacing can be provided. This variable ocular spacing is provided by the simple expedient of moving the viewer towards or away from the field mirror. Thus, the apparatus of this invention has no need to provide a complex apparatus for interocular spacing.

A further advantage of this invention is that the stereo magnifiers can be provided with a relatively large exit pupil. With these large exit pupils, the criticality of eye positioning of the head and both eyes of the viewer is reduced.

A further advantage of this invention is that the viewer can use his prescribed glasses. Thus, where the eyes of the viewer have been large cylinder correction, or alternately, differing corrections for differing eyes, no modification of the microscope has to occur to produce optimum view. All the viewer need do is wear his glasses when using the remote relayed images of the microscope.

Yet another apsect of this invention is that the viewer can position his eyes at or near the relay stop of the magnifier. This enables not only the field of view of the magnifier to be optimized but additionally assures optimum magnifier performance with minimum magnifier optical imperfections.

A further object of this invention is to disclose the configuration of a compound stereo microscope with a compact head immediate an object to be viewed. A periscoping system is typically placed immediate to the magnifier optics having a prism array (which prism array is preferably in a conventional prism). Light for one eye path is totally reflected at a first prism wall to cross under the mirror axis and pass normally to and out of the prism at a second wall. A plane mirror or set of mirrors relays the object image from one ocular to the plane of the field mirror. Likewise, light for the other eye is totally reflected at the second prism wall to cross under the mirror axis and pass normally to and out of the prism at the first wall. Another plane mirror or set of mirrors relays the object image for the other ocular to the plane of the field mirror.

An advantage of this aspect of the invention is that the objective and eye piece of the compound microscope can be placed in various positions with respect to the prism array.

A further advantage of the array herein disclosed is that stereo angularity is easily provided to the discrete stereo light paths emanating from the object. This angularity can in turn be imparted to the light which impinges on the field mirror by the prism array to result in light angularity being imparted to the viewer. This angularity imparts to the stereo image a true stereo effect.

A further advantage of the prism array is that the light paths can be configured to cross each other in space interior of the prism. Bulk of the optical instrumentation is vastly reduced.

Yet another advantage of using a conventional prism in the prism array is that the reflecting surface for one ocular path can be the window for the other ocular path. Instrument bulk is vastly reduced in the vicinity of the magnifier and interference of crossing optical paths is lessened.

A further advantage of the prism array disclosed with this invention is that it can be used with the compound microscope. As used with the compound microscope, an appreciable work distance between the microscope and object can be generated. An instrument suitable for assembly of miniature parts or for delicate surgical operations results.

Yet another advantage of the prism assembly of this invention is that it can be used with a simple magnifier. Moreover, the simple magnifier can use either one lens or two lenses.

An advantage of this aspect of the invention is that with simple magnifiers, stereo images have heretofore been most difficult or impossible to obtain. The disclosed prism array permits even a single simple magnifier to be utilized to generate a stereo view, a stereo view not being practical with use of a simple magnifier alone.

Other objects, features and advantages of this invention will become more apparent after referring to the following specification and attached drawings in which:

I hereby incorporate by reference as if fully set forth herein my co-pending patent application entitled "Remote View Microscope Having Field Mirror Projected Image with Relayed Stop", U.S. Pat. application Ser. No. 563,282, filed on Mar. 28, 1975.

In this application a microscope is disclosed with a field mirror having a magnified view behind and typically above an object. The viewer is positioned distant from the field mirror to view the object either directly or in a magnified image in the plane of the field mirror. A magnifier, either simple or compound, overlies the object so as to leave the direct view-to-object eye path unobscured. This magnifier relays a real image of the magnified object away from the viewer to substantially the plane of the field mirror. The field mirror is positioned so that the lens stop or exit pupil of the magnifier is at a first off-axis conjugate of the field mirror and the real image of the lens stop or exit pupil is relayed to a second and complementary off-axis conjugate of the field mirror. The viewer in placing his eye along the light path from the field mirror proximate the second and complementary off-axis conjugate is afforded a remote wide angle magnified view of the object when he glances at the field mirror. Where a simple magnifier is used, the eye of the viewer can be placed at the relayed stop to view a wide angle magnified image. Where a compound magnifier is used, the magnifier can generate an appreciable work distance between the object and magnifier optics as well as providing viewer positioning at the exit pupil or stop. By the expedient of projecting the real image from both simple and compound magnifiers to the field mirror, the optics of the field mirror are essentially confined to a relay of the stop or exit pupil. The optics of the mirror do not participate in the magnification and hence do not generate appreciable coma, astigmatism, spherical aberrations, and distortion associated with the off-axis use of a conventional spherical field mirror. Provision for centering of the eye at the relayed stop or exit pupil is disclosed.

The invention claimed in this application includes a microscope for projecting a magnified image of an object to an eye of a viewer at a location in space removed from said object, said microscope comprising: a magnifier having a magnifier stop, said magnifier addressed to said object at a distance to project an image of said object at a preselected distance away from said magnifier; a field mirror aligned to receive the projected image of said magnifier in substantially the plane of said mirror and to receive the light of said image at a first off-axis angle with respect to the axis of said field mirror; and, said field mirror disposed with respect to said eye of said viewer to relay the light of said image at a second and complementary off-axis angle along a magnified view path to the eye of said viewer and to relay to a conjugate location of said field mirror in space the stop of said magnifier so that the eye of said viewer when positioned at said relayed stop receives a view of said object equivalent to the light emanating from said stop of said magnifier as collected by said field mirror.

It will be appreciated that the drawings of this patent application will suffice to describe my other referenced patent application, the main exception being that here I disclose a stereo projection and in the application that I incorporate by reference I disclose a monocular projection.

Figure 1:
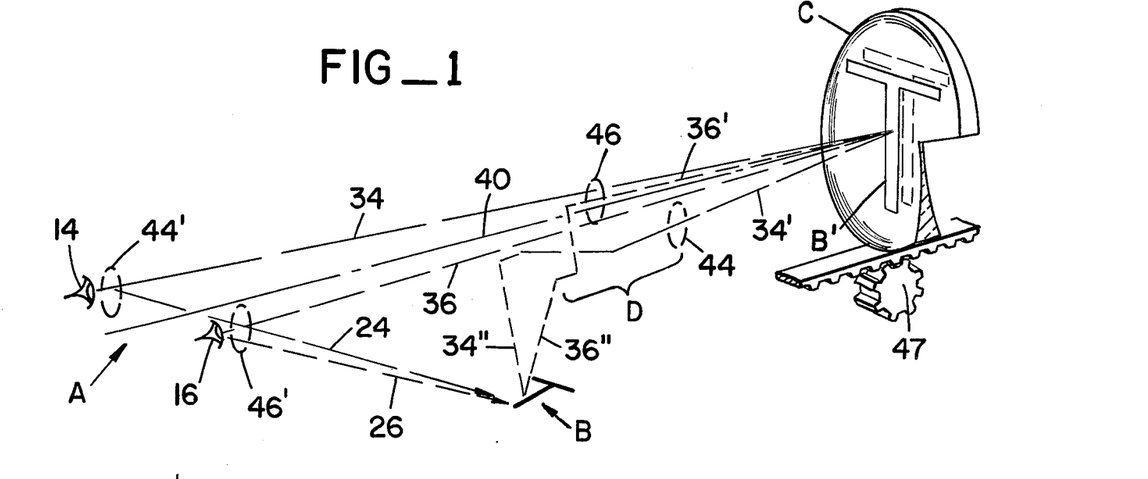
FIG. 1 is a perspective schematic view illustrating an object, a field mirror and a viewer with the specific magnifying optics being omitted so that just the view paths can be set forth with clarity.

Referring to FIG. 1, the configuration of the eye paths used with this invention are schematically shown. A viewer A here schematically shown only by eyes 14, 16 is provided with two view paths to an object B. The first view path is a direct view path along the view paths 24, 26. The second view path is the indirect and magnified view path along the view paths 34, 36. Discussion of the view paths 34, 36 with respect to the field mirror C and the magnified image B' of target B in field mirror C will first occur. Thereafter, the configuration on the prism assembly D will occur. As will hereinafter be more apparent, this prism assembly D can include numerous embodiments so long as it fits within the parameters of the field mirror system.

Field mirror C is typically spherical. It is here shown having a radius of curvature in the order of 16 inches. It is aligned with its axis passing between and angularly below the paired eye paths.

To understand the magnified view paths herein provided it will be most convenient to discuss the view paths from the viewer to the object (although the light travels in the opposite direction). Referring to view path 34 between eye 14 of the viewer A and the image B' in mirror C, it will be observed that this view path is above and to the left of the axis 40 of the field mirror C. When the eye path rebounds from field mirror C at 34', it will be seen that the light path is below and to the right of the axis 40 of the field mirror C. Thus, in order to restore stereo parity to a view of the object B, the light path 34' will have to be relayed to the opposite side of object B and impinge angularly downward onto object B. This is schematically shown at light path 34''.

This periscoping of the light path 34'' to the opposite side of object B and its angular direction down onto the object B is the function of prism assembly D hereinafter to be described with reference to FIGS. 2a–2c, 3a, 3b, 4 and 5.

The light path from eye 16 is analogous. Specifically, light path 36 approaches field mirror B above and to the right of axis 40 of the field mirror. The light retroreflects from field mirror C below and to the left of the axis of the field mirror at 36'. In prism assembly D, it is periscoped across mirror axis 40 so as to impinge on object B downwardly and angularly as light path 34''.

Before proceeding on to a detailed description of this invention, two important points should be understood. Typically, each eye path will be provided with a magnifier or object lens proximate object T. First, each magnifier will include a magnifier stop 44 in eye path 34', and 46 in eye path 36'. Second, each magnifier will have its own discrete image.

Regarding the magnifier stop, field mirror C will cause each magnifier stop to be relayed. Typically, each magnifier stop will be relayed to a conjugate location with respect to field mirror C. Thus, stop 44 is relayed to a position remote from field mirror C at 44' adjacent eye 14 of viewer A. Likewise, stop 46 is relayed to a position 46' proximate eye 16 of viewer A. As will hereinafter become more apparent, it is preferred that viewer A move his eyes so that they are along the view path from field mirror C immediate the stop 44' for eye 14, and immediate stop 46' for eye 16. The viewer can thus get the same magnified view of object B in field mirror C as he would receive if he had his eyes positioned at each magnifier.

Secondly, and regarding the image from each magnifier, it is preferred to have the magnifier project a magnified image for each eye path onto substantially the plane of the field mirror C. Thus, one image for eye path 34' will appear at B' in field mirror C. Another image for eye path 36' will additionally appear at the double image B' shown in field mirror C. This effect is achieved by having the stereo magnifier addressed to the object at a distance slightly beyond its focal length for example. This results in an image being projected in the plane of the mirror at a considerable distance from the magnifier.

It will be understood that each eye path will be confined to view by each eye and will not be viewed by the other eye. This is because the stops 44' and 46' as remotely reflected from their conjugate positions, 44, 46, will confine the eyes of the viewer to each discrete image for each discrete ocular path 34, 36.

Having set forth the direct and indirect eye paths to object B, demonstrated the off-axis use of the field mirror C as assisted by prism D, and having understood the relay of stops 44, 46, attention can now be directed to the remaining views of FIGS. 2a–2c, 3a, 3b, 4 and 5. It should always be remembered in discussing any of these views, that the assembly is mounted in the eye path illustrated in FIG. 1 immediately overlying the object B and serves to broadcast for each ocular path an image B' into the plane of a field mirror C with the relay of the stops 44', 46'. For convenience and to preserve this understanding, the eye paths and stops will always hereinafter be given the same numeric designation.

Figures 2A, 2B, 2C:
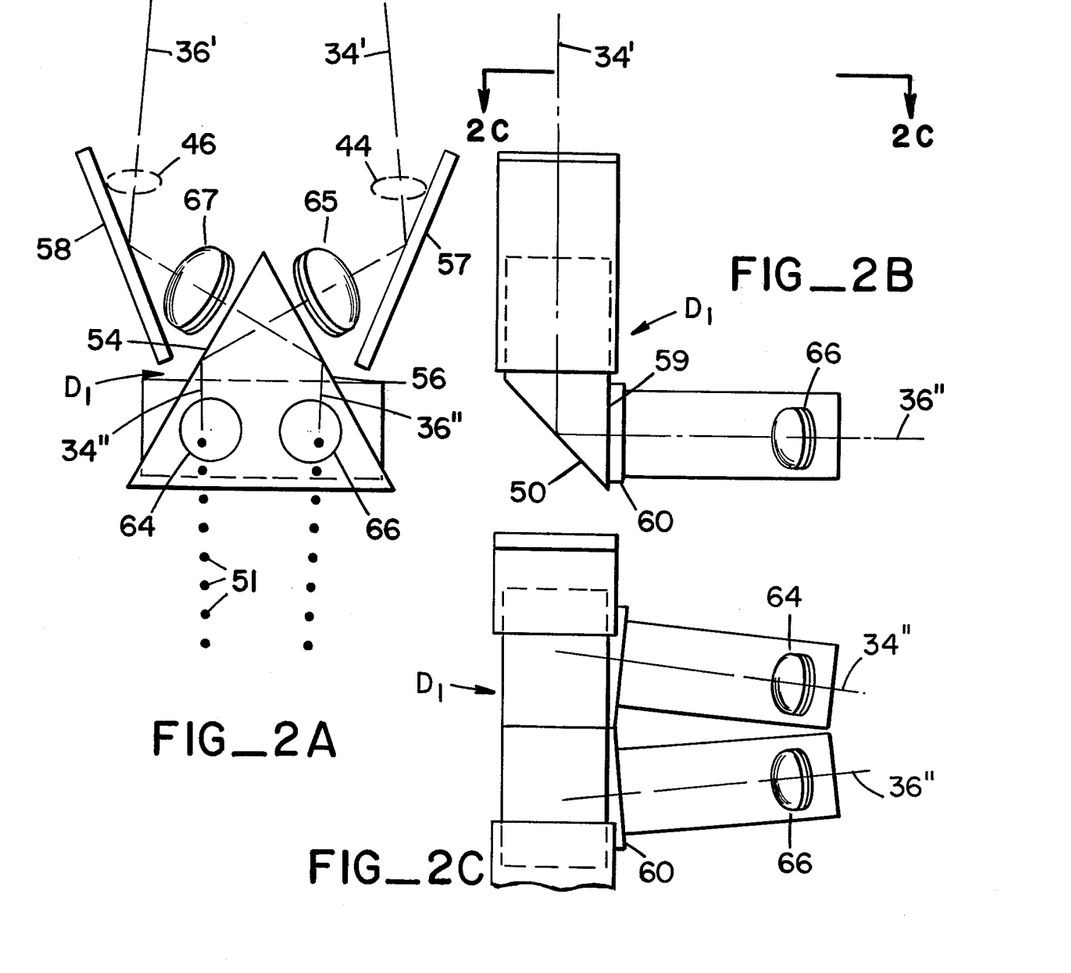
FIGS. 2a, 2b and 2c are respective plan, side elevation and end elevation views of a prism microscope using compound microscope optics.

Referring to FIGS. 2a–2c, a prism assembly $D_1$ is shown combined with a compound microscope for each eye path.

In discussing each of the magnifiers in the figures that follow, attention will first be given to the configuration of the prisms. Secondly, placement of the compound microscope for each of the ocular paths will be discussed. Finally, the function of these lenses and prisms in relaying the optical paths will be set forth.

Regarding the compound microscope of FIGS. 2a–2c and its prism configuration, light emanating from the object is imaged upwardly to a diagonal reflecting surface 50 at an angle exceeding the critical angle of the prism glass. Specifically, and as shown by the dotted lines 51 in FIG. 2a, light diverges from the object to each ocular at an angle of 5° from the vertical. Upon impingement at reflective surface 50, which surface is a prism surface, typically unsilvered, the light of light path 34'' is directed upon a wall 54 at an angle greater than the critical angle and is reflected across the prism and out of the prism by passing normally through wall 56. When light from light path 34″ is reflected out of the prism normally to wall 56, it impinges upon a mirror 57 and exits the prism mirror array on light path 34′.

The configuration of light path 36″ is analogous. It is reflected at the prism surface 50 and impinges at an angle greater than the critical angle of the prism glass at prism wall 56. The light is then impinged normal to wall 54 and passes out of the prism for impingement at a flat mirror 58 and then is directed to the field mirror along eye path 36′. It will be noted that eye paths 34′, 36′ converge to the field mirror at an angle of approximately 3° with respect to a horizontal plane underlying the axis 40 (see FIG. 1) of the field mirror.

Regarding the construction of the prism periscope system, it will be seen that each of the prism walls 54, 56 is a reflecting surface for one light path and a window for the remaining light path. Moreover, each of the light paths crosses the other light path interior of the prism. It is the duality of function of the prism walls combined with the crossing of the light paths which imparts to the prism arrangements here shown compactness together with minimal interference of the light beams.

It will be understood in referring to the light paths schematically illustrated in FIG. 1 that light paths 34″ and 36″ are there shown crossing one another in space after they have been diverted from an upward path to a substantially horizontal path toward the field mirror. In many cases, it may be preferred to effect crossing of the light paths before the light path is diverted horizontally away from the viewer to the field mirror. For example, with such a configuration it is possible to have the stop or pupil of the magnifier closer to the center of curvature of the field mirror. The relayed stop or pupil will thus be more nearly at a conjugate location which is equidistant from the field mirror. With this type of spacing, the field mirror participates to a minimum in image magnification.

It should be appreciated that the apparatus of this invention conveniently adapts itself to variations in interocular spacing. For example, it has already been emphasized that by the simple expedient of having the viewer move his head towards and away from the field mirror, some variation in interocular spacing can be achieved.

It should be understood, however, that such movement will tend to move the eyes 14, 16 of the viewer A out of the optimum viewing location provided by the relayed stops or pupils 44′, 46′.

An alternate way of providing variable interocular spacing may be to cause field mirror C to be movable towards and away from viewer A. This may simply be accomplished by a rack and pinion drive mechanism 47 affecting field mirror movement. As will be apparent with movement away from the viewer, the interocular separation at pupils 44′, 46′ will decrease. With field mirror movement towards the viewer, the interocular separation of pupils 44′, 46′ will increase.

It will immediately be understood that the mechanism herein disclosed is replete with other opportunities for changing of interocular spacing. For example, any one of the numerous reflective surfaces in either of the eye paths could be provided with a change in angularity to provide variable interocular spacing.

A configuration of prism $D_1$ which will work with this invention includes a prism wherein walls 54, 56 are separated by an angle of approximately 56⅔°.

Before proceeding on to a description of the compound optics for each ocular path, it will be understood that each of the light paths 34″, 36″, as it impinges upon the prism assembly normal to the lower wall 59 of the prism assembly, impinges at an angle. If an angularity of the prism is not provided normal to the impingement of each of the light paths 34″, 36″, a chromatic aberration will occur. To prevent this chromatic aberration, two wedges 60 are provided. These wedges, of the same optical material as the prism, allow the light to enter the prism normally and prevent chromatic aberration of the light interior of the prism.

Having set forth the function of the prism D, the lenses for each of the light paths 34″, 34′, 36″, 36′ can now be set forth. Eye path 34″ includes an objective 64 and an eye piece 65. Objective 64 is adjacent the object and is here shown as a typical microscope objective doublet. Likewise, eye piece 65 is affixed between wall 56 of the prism D and mirror 57, and is a typical microscope eye piece doublet. As is conventional in compound microscopes, eye piece 65 will project an image of the objective 64. This image will be projected to exit pupil 44.

The function of the objective 66 and eye piece 67 in the ocular path 36″, 36′ is analogous. Objective 66 is adjacent the object. Eye piece 67 is adjacent wall 54 of the prism D. This eye piece relays an exit pupil 46 to a position here shown just beyond the mirror 58.

It will of course be understood that the term "eye piece" as it refers to eye piece 65 and eye piece 67, has here been used in a descriptive sense only. In actual fact, field mirror C serves to relay the exit pupils of eye piece 65, 67.

In operation, the image of the object will be inverted by the objectives 64, 66. This inverted image, when viewed by the eye pieces 65, 67, will be reinverted for each ocular path. To preserve image parity, all that is required is that the prism assemblies provide an even number of reflections between the object and the eyes of the viewer. By tracing each of the eye paths, it will be apparent that each eye path undergoes four separate reflections. With four separate reflections, the parity at each image is preserved. The array shown in FIGS. 2a–2c is capable of generating a 3-inch working distance to the object. Moreover, powers in the range of 2 to 300 power can be accommodated by suitable combinations of lens powers at the ocular and objective positions.

Figure 3A:
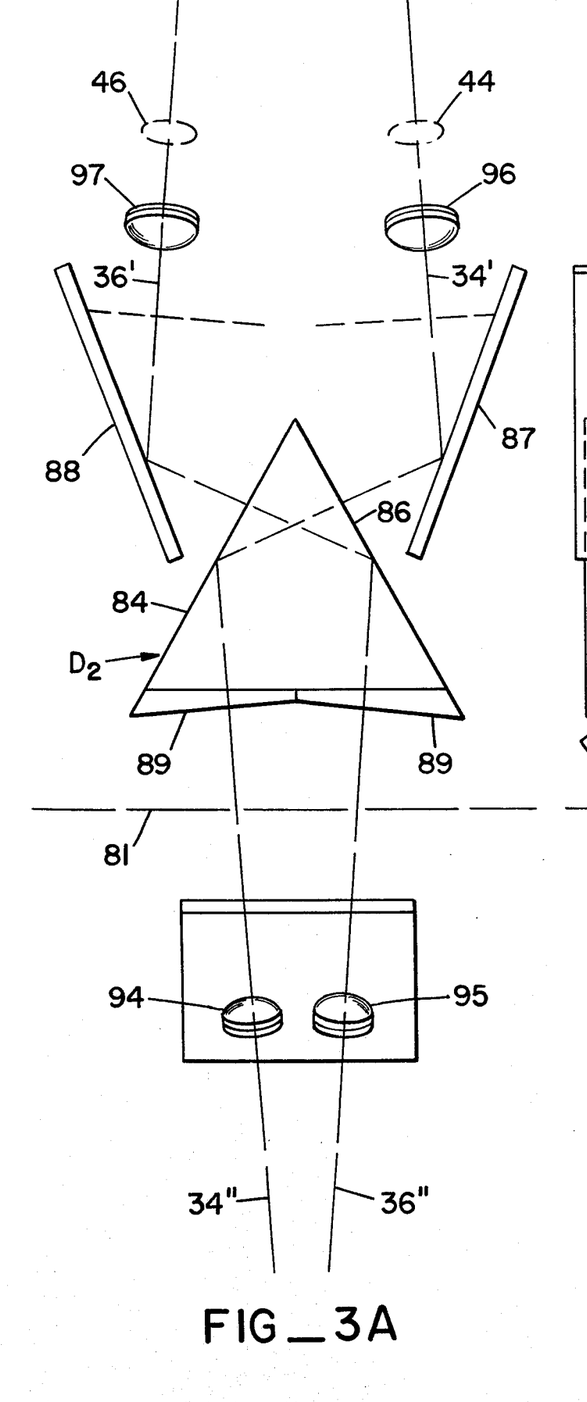
FIGS. 3a and 3b are respective plan and side elevation views of a stereo microscope with the objective and eye piece being on either side of the prism and mirror system.
Figure 3B:
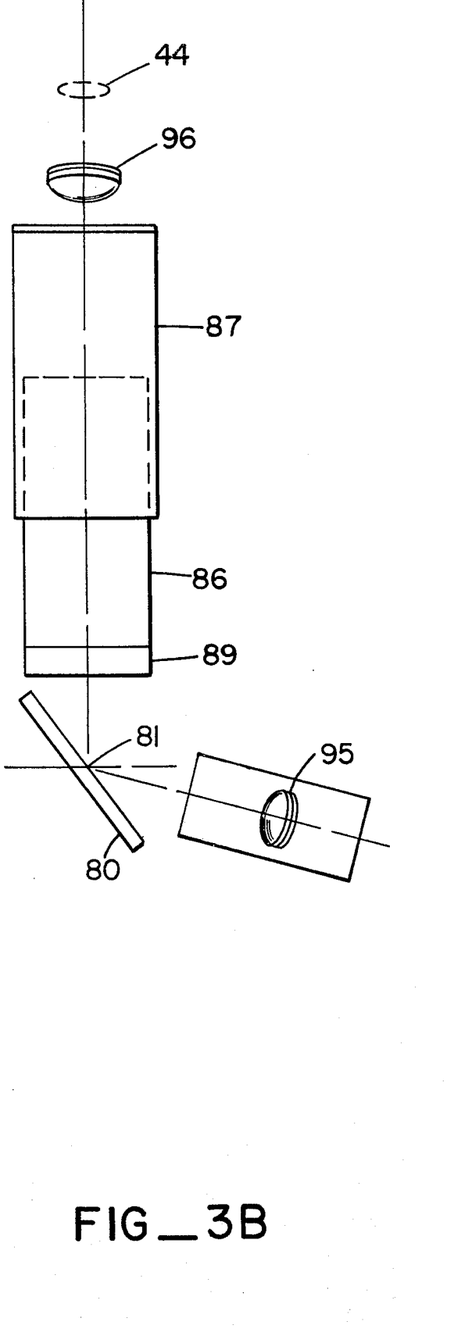

Referring to FIGS. 3a and 3b, a prism assembly $D_2$ is shown combined with a compound microscope for each path. Again, in discussing the compound microscope of FIGS. 3a and 3b, attention will first be given to the configuration of the prism. Second, placement of the compound microscope for each of the ocular paths will be discussed. Finally, the function of these lenses and prisms in relaying the optical paths will be set forth.

Light emanating from the object at light paths 34″, 36″ is imaged upwardly to a diagonal mirror 80, which mirror in FIG. 3a is schematically represented by a pivot axis 81 at a broken line, but is shown in side elevation in FIG. 3b. Light diverges from the object to each ocular at an angle of approximately 5° from the vertical. Upon impingement at the reflective surface 80 which is typically a mirror having a silvered front surface, the light path 34″ to the left eye 14 of the viewer A impinges upon a wall 84 at an angle greater than the critical angle and is reflected out of the prism at a wall 86 by passage normal to the wall. When light from light path 34″ is reflected out of the prism normally to wall 86, it impinges upon a mirror 87 and exits the prism mirror array on light path 34′.

The configuration of light path 36″ is analogous. It is reflected at mirror 80 and impinges at an angle greater than the critical angle of the prism glass at prism wall 86. The light is then impinged normally to wall 84 and passes out of the prism for impingement at a flat mirror 88 and then to the direction of the field mirror along eye path 36′. It will be noted that the eye paths 34′, 36′ converge to the field mirror at an angle of approximately 3° each.

A configuration of the prism D which will work with this invention includes a prism wherein the walls 84, 86 are separated by an angle of approximately 56°. Similar to the prism illustrated in FIGS. 2a–2c, it is necessary to place a 5° wedge 89 to prevent chromatic aberration of the light passing through the prism $D_2$ of FIGS. 3a and 3b.

Regarding the compound optics shown in FIGS. 3a and 3b, eye path 34″ includes an objective 94. This objective is adjacent the object and is here shown as a typical microscope objective doublet. Likeise, eye piece 96 here shown mounted along optical path 34′ beyond the mirror 87 is a typical microscope eye piece doublet. As is conventional, eye piece 96 will project an image of the objective 94. This image will be projected to image stop 44. The function of the other objective 95 and the eye piece 97 in the ocular path 36″, 36′ is analogous. Objective 95 is adjacent the object. Eye piece 97 is placed along path 36′ beyond mirror 88. The eye piece relays a stop 46 of the objective to a position here shown beyond the eye piece 97.

In operation, the image of the object will be inverted by the objectives 94, 95. This inverted image, when viewed by the eye pieces 96, 97 will be reinverted for each ocular path. As can be seen by a quick count of the reflections, image parity is preserved by an even number of reflections between the object and the eyes 14, 16 of the viewer.

It should be appreciated that the eye path here can be adjusted in its angle of impingement onto a target. By the simple expedient of hinging mirror 80 (shown in FIG. 3b) along an axis 81 (shown in FIG. 3a), a variable angle of impingement on an object can be generated.

Moreover, powers in the range of 2 to 300 power can be accommodated by the stereo imaging train here shown.

Figure 4:
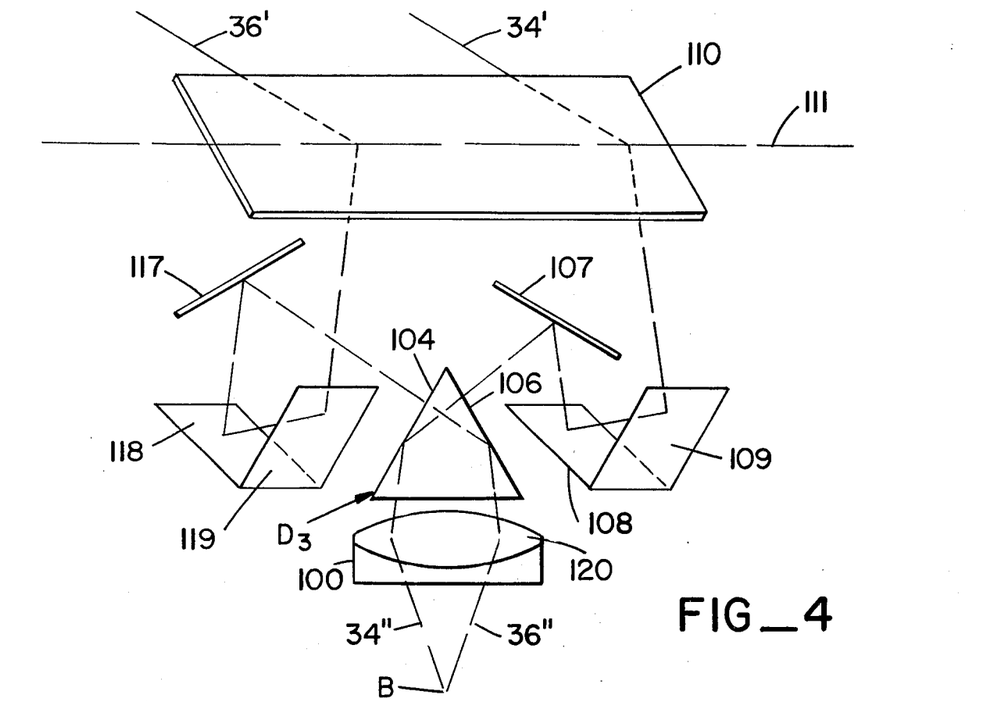
FIG. 4 is a perspective view of the apparatus of this invention being utilized to generate a stereo view from a single simple magnifier; and, FIG. 5 is a perspective view of a prism assembly being utilized to generate a stereo view from paired simple magnifiers.
Figure 5:
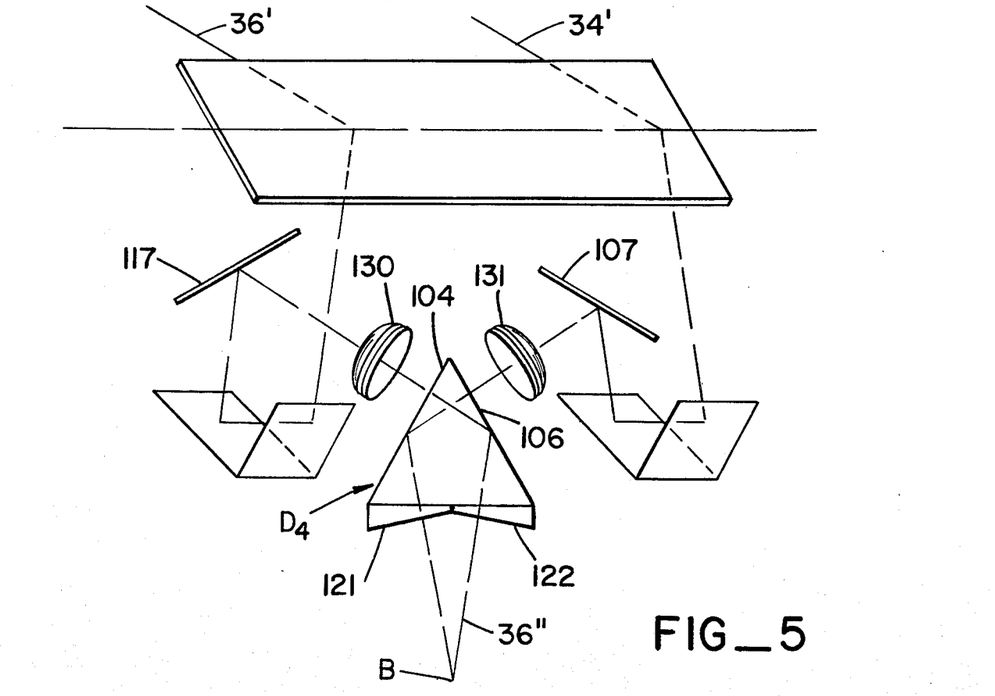

It will be appreciated that the stereo view path as produced by the prism here shown is capable of being used with a simple magnifier. The configuration of this apparatus utilizing simple magnifiers is shown in FIGS. 4 and 5. In FIG. 4, a single simple magnifier is used. In FIG. 5, a single simple magnifier is used for each ocular path for a total of two simple magnifiers.

In discussing the simple magnifier, attention will first be given to the prism and mirror array. Secondly, the placement of the simple magnifier will be discussed. Finally, the function of the simple magnifier and the prism and mirrors in relaying the optical paths will be set forth.

Referring to FIG. 4, light emanating from object B enters prism $D_3$ nearly normal to surface 100. The light of light path 34″ impinges upon a wall 104 at an angle greater than the critical angle and is reflected out of the prism at a wall 106. When light from light path 34″ is reflected out of the prism normally to wall 106, it impinges upon a first mirror 107. Mirror 107 in combination with mirror 104 forms one half of a porro prism mirror inverter array.

Thereafter, the light impinges upon a second mirror 108 and a third mirror 109. Mirrors 108 and 109 form the remaining half of a porro prism inverter mirror array. Thus, where a simple magnifier affects inversion of an image, the porro prism mirror array of reflective surfaces 104, 107, 108, 109 reinvert the image so that overall image erectness results.

All that remains is to divert view path 34′ to the field mirror C. This is done on a mirror 110, which mirror 110 can provide the whole assembly with a pivot along an axis 111.

The remaining ocular path of light path 36″ is analogous. Light enters the mirror nearly normal to prism surface 100 and impinges at wall 106 at an angle greater than the critical angle. It passes outwardly of the prism normal to wall 104 and impinges on a first mirror 117. Mirror 117 in combination with wall 106 forms one half of a porro prism mirror inverter. The light then impinges upon a second mirror 118 and a third mirror 119 which forms the remaining half of the porro prism mirror inverter array. Thereafter, the light is reflected at the mirror 110 to light path 36′ to the field mirror F. Preferably, light paths 34′, 36′ converge at an angle of approximately 3° each.

The simple magnifier here comprises a positive achromatic doublet 120. It will be noted that doublet 120 is the single lens for both stereo light paths 34″, 36″ to the object B.

It will be further understood that the relayed stops 44′, 46′ for eyes 14 and 16 respectively (see FIG. 1) will each be images of portions of the simple magnifier 120. Thus, in the apparatus of FIG. 4, a single lens is being utilized to provide stereo paths.

In operation, the image of the object will be inverted by the single objective 120. The porro prism mirror array comprising reflective surfaces 106, 117, 118 and 119 for eye path 36′ will affect a reinversion of the image. After the image is reinverted, it will receive an even number of reflections to the respective eyes 14, 16 of the viewer. The first reflection will be at a mirror 110. The second reflection will be at field mirror C.

The array shown in FIG. 4 is capable of generating a ¾-inch work distance for magnifying power from 8 to 10 power.

It will be understood that the simple magnifier of FIG. 4 is capable of generating an appreciable work distance as far as simple magnifiers are concerned. This magnifier, however, includes a light bundle which is relatively large from the magnifier through each magnifying path 34″, 34′, 36″, 36′ to field mirror C. Large mirror sizes must therefore be used.

Moreover, referring to the apparatus of FIG. 4, it will be seen that the respective side portions of the lens element 120 are used by each of the principal view paths. This may not be desirable. To correct this, a prism configuration shown in FIG. 5 can be used.

Referring to FIG. 5, a prism $D_4$, substantially identical to prism $D_3$, is utilized. This prism, however, includes paired wedges 121, 122 addressed normally to the object B.

Regarding the reflection system comprised of the prism sidewalls and mirrors, the optical effect is precisely identical as to that shown in FIG. 4. It is the position of the simple magnifier which is changed.

Referring to wall 104 of prism D₄ and mirror 117, it will be seen that the objective 130 for eye path 36″ is located between surface 104 and mirror 117 which is part of the inverting porro prism array.

Similarly, and between wall 106 of prism D₄ and mirror 107, a second simple magnifier 131 is shown. Naturally, magnifiers 130, 131 are precisely the same in configuration.

Typically, the simple magnifiers 130, 131 have powers in the range of below 10 power. As a single magnifier is not used at its edge in each case, a more efficient use of the magnifier results.

It should be understood that a number of modifications can be made with respect to this invention. For example, the periscoping optical path can have a number of optical arrays. Likewise, the magnifying optics here shown can be placed at varying location along each of the ocular paths.

I claim:

1. A microscope for projecting magnified stereo images of an object to eyes of a viewer at binocular locations in space removed from said object, said microscope comprising: a stereo magnifier with paired magnified paths; each path having a magnifier viewing pupil, said stereo magnifiers addressed to said object at a distance to project stereo images of said object at a preselected distance away from said magnifier along an optical path; a field mirror having an axis aligned to receive the projected image from each magnified path of said stereo magnifier in substantially the plane of said mirror; said paired magnified paths from said stereo magnifier between said field mirror and said magnifier including means for relaying one magnified path from one side of said mirror axis to the other side of said mirror axis and the other magnified path from said other side of said mirror axis to said one side of said mirror axis and said field mirror disposed with respect to the eyes of said viewer to relay the light of said images to the eyes of the viewer and to relay the conjugate location of the viewing pupils of said magnifier so that the eyes of the viewer when positioned at the relayed viewing pupils view the image in the plane of the mirror for one eye without viewing the image for the other eye.

2. The invention of claim 1 and wherein said stereo magnifier includes one simple magnifier, said simple magnifier magnifying images in both said magnified paths.

3. The invention of claim 1 and wherein said stereo magnifier includes two simple magnifiers, each simple magnifier being disposed in one of said magnified paths.

4. The invention of claim 1 and wherein said stereo magnifier includes paired compound magnifiers, each compound magnifier being disposed in one of said magnified paths.

5. The invention of claim 1 and including a direct stereo viewing path from said conjugate location of said viewing pupils to said object to provide said viewer with a direct stereo view to said object without substantial head motion.

6. The invention of claim 1 and including means for changing the length of said magnified viewing paths between said object, field mirror, and viewer.

7. The invention of claim 6 and wherein said means for changing the length of said viewing path includes means for moving sai field mirror towards and away from said viewer.

8. A microscope for projecting magnified stereo images of an object to eyes of a viewer at binocular locations in space removed from said object, said microscope comprising: a stereo magnifier with paired magnified paths; each path having a magnifier stop, said stereo magnifiers addressed to said object at a distance to project stereo images of said object at a preselected distance away from said magnifier along an optical path; a field mirror having an axis aligned to receive the projected image from each magnified path of said stereo magnifier in substantially the plane of said mirror; said paired magnified paths from said stereo magnifier between said field mirror and said magnifier including first reflecting means for relaying one magnified path from one side of said mirror axis to the other side of said mirror axis and second reflecting means for relaying the other magnified path from said other side of said mirror axis to said one side of said mirror axis and said field mirror disposed with respect to the eyes of said viewer to relay the light of said images to the eyes of the viewer and to relay the conjugate location of the stops of said magnifier so that the eyes of the viewer when positioned at the relayed stops view the image in the plane of the mirror for each eye without viewing the image for the other eye.

9. The microscope of claim 8 and wherein said magnified paths cross one another in space between said object and said field mirror.

10. The microscope of claim 8 and including a prism disposed between said object and said viewer in both of said light paths; and said first reflecting means includes a first wall of said prism for reflecting light normal to a second wall of said prism and said second reflecting means includes a second wall of said prism for reflecting light normal to a first wall of said prism and said first and second walls of said prism pass rays normal to said walls out of said prism.

11. A microscope for projecting magnified stereo images of an object to the eyes of a viewer at binocular locations in space removed from said microscope and said object, said microscope comprising: a stereo magnifier with paired magnifying paths each path having a viewing pupil; said stereo magnifier is addressed to said object to project stereo images of said object at a preselected distance away from said magnifier along an optical path; a field mirror having an axis aligned to receive the projected image from each magnified path of said stereo magnifier is substantially the plane of said mirror; said paired magnified paths from said stereo magnifier between said field mirror and said magnifier including means for transferring each path from one side of the axis of said mirror to the other side of the axis for said mirror; and, said means for relaying including a prism having first and second entrance surfaces disposed normally to the entering principal ray of said object and including a first prism wall for reflecting one light path and passing the other light path out of said prism and a second prism wall for reflecting the other light path and passing the first light path out of said prism and reflecting means for both of said light paths as passed out of said prism for reflecting said light paths in converging relationship to said field mirror.

12. A microscope according to claim 11 and wherein said magnified light paths cross each interior of said prism.

13. A microscope according to claim 11 and wherein said light paths emanate from said object substantially vertically upward and including deflecting means for relaying each of said magnified light paths away from said viewer to said field mirror.

14. A microscope according to claim 13 and wherein said relaying means is between said object and said deflecting means.

15. A microscope according to claim 13 and wherein said relaying means is between said deflecting means and said field mirror.

* * * * *